US 8,214,744 B1

(12) United States Patent
Frank et al.

(10) Patent No.: US 8,214,744 B1
(45) Date of Patent: Jul. 3, 2012

(54) INTEGRATED DEVICE INTERFACE USING MULTIPLE WEB SERVERS

(75) Inventors: Joseph Frank, Boulder, CO (US); Brian Gruttadauria, Sutton, MA (US); Luis Pabon, Sturbridge, MA (US); Sigalit Adoot-Tari, Boulder, CO (US)

(73) Assignee: EMC Corporation, Hopkinton, MA (US)

( * ) Notice: Subject to any disclaimer, the term of this patent is extended or adjusted under 35 U.S.C. 154(b) by 1012 days.

(21) Appl. No.: 12/059,480

(22) Filed: Mar. 31, 2008

(51) Int. Cl.
*G06F 13/00* (2006.01)

(52) U.S. Cl. ........................................ 715/748; 715/735

(58) Field of Classification Search .................. 715/513, 715/760, 748–749, 735, 765, 734, 736–738, 715/771, 741–743; 705/59; 707/501, 100
See application file for complete search history.

(56) References Cited

U.S. PATENT DOCUMENTS

| | | | |
|---|---|---|---|
| 6,623,527 B1 * | 9/2003 | Hamzy | ........................ 715/234 |
| 7,020,532 B2 | 3/2006 | Johnson et al. | |
| 7,500,597 B2 | 3/2009 | Mann et al. | |
| 7,698,389 B2 | 4/2010 | Sesek et al. | |
| 2002/0036793 A1 * | 3/2002 | Roosen et al. | ............... 358/1.15 |
| 2002/0171863 A1 * | 11/2002 | Sesek | ........................... 358/1.15 |
| 2003/0084105 A1 * | 5/2003 | Wiley et al. | ................... 709/205 |
| 2004/0039802 A1 * | 2/2004 | Stringham | ..................... 709/222 |
| 2004/0039911 A1 * | 2/2004 | Oka et al. | ........................ 713/175 |
| 2007/0203845 A1 * | 8/2007 | Gross et al. | ...................... 705/59 |
| 2007/0208834 A1 * | 9/2007 | Nanamura et al. | ............ 709/220 |
| 2008/0221980 A1 * | 9/2008 | Greeson et al. | ................. 705/14 |

* cited by examiner

*Primary Examiner* — Steven Sax
(74) *Attorney, Agent, or Firm* — BainwoodHuang

(57) ABSTRACT

A method is provided for operating a system which includes a local device running a local web server and a remote device running a remote web server. The method includes (a) running a web browser on the local device, (b) rendering a series of web pages on the web browser, the series of web pages including (i) a set of local web pages served from the local web server, the set of local web pages providing configuration information regarding the local device, and (ii) a set of remote web pages served from the remote web server, the set of remote web pages providing configuration information regarding the remote device, and (c) controlling the configuration of the local device or the remote device based on user interaction with the series of web pages. Computer program products for causing a computer to perform various operations to perform the method are also provided.

8 Claims, 5 Drawing Sheets

INTEGRATED DEVICE INTERFACE USING MULTIPLE WEB SERVERS

BACKGROUND

Sometimes, to make two computers work together over a network, a user must make configuration changes on both computers. For example, suppose that a first computer must be configured to print documents from a local printer attached to a second computer. To implement this configuration, the user physically goes to the input/output (I/O) devices of the first computer to make certain configuration changes to the operating system configuration of the first computer, i.e., the user operates the keyboard, mouse and display of the first computer to effectuate the configuration changes. Similarly, the user further physically goes to the (I/O) devices of the second computer to make cooperative configuration changes to the operating system configuration of the second computer. Once the configuration changes are in effect on both computers, the user is then able to print a document from the first computer on the local printer attached to the second computer.

Some sophisticated software programs enable a user to implement configuration changes remotely over a network. For example, to implement the above-described configuration changes regarding remote printer access, the user is able to locally make certain configuration changes directly to the operating system configuration of the first computer by using the I/O devices of the first computer (i.e., the keyboard, mouse and display of the first computer). The user is further able to remotely make certain configuration changes to the operating system configuration of the second computer using a heavy-weight style software tool such as Remote Desktop, i.e., a second user interface application. Here, the user remotely accesses the second computer over the network and then makes certain configuration changes to the operating system configuration of the second computer using the I/O devices of the first computer.

Another example of an approach to remotely configure an electronic device over a network can be found in certain conventional home office network routers. In some instances, such devices include a custom built-in web server, which is capable of serving web pages that provide an interface for a remote user to access through a web browser and adjust device and network configuration parameters.

SUMMARY

Unfortunately, there are drawbacks to the above-described conventional approaches to implementing configuration changes among multiple computers. For example, manual configuration is time-consuming, difficult, and subject to human-error. Moreover, the user is potentially subject to diverse user interfaces for the control of the device and the remote computer, and the user must independently switch between configuring the device and the remote computer.

An alternative is for the user to run a first custom heavy-weight style application on the first computer, and a second heavy-weight style application on the second computer. The first application running on the first computer would provide the user with a user interface and have the ability to implement configuration changes on the first computer. The second application running on the second application would have the ability to respond to commands (e.g., remote procedure calls) from the first application by implementing configuration changes on the second computer. Unfortunately, such coordination of custom heavy-weight style applications on the computers is inefficient and difficult to install and maintain, particularly when an update is required.

In order to overcome the limitations of the above-described conventional approaches, improved techniques for implementing configuration changes on multiple computers involve the use of multiple web servers. In one embodiment, a method for operating a system having a local device and a remote device, each running a web server, is provided. The local device also runs a web browser which is capable of communicating with both the locally-running and remotely-running web servers, each of which implements different functions. However, the locally-running and remotely-running web servers are tightly integrated to allow configuration of both devices to occur in a seamless manner.

In other embodiments, computer program products are provided. In one embodiment, the computer program product is a locally-operating web server which receives a request from a locally-operating browser for a configuration page for establishing a shared resource, such as a shared folder. The locally-operating web server forwards the request to a web server operating on a remote device. The browser and the remote web server may then interact until configuration details for the shared folder are provided to the remote web server, which are then provided to the local web server, which is then able to locally configure the shared folder by mounting it locally.

In another embodiment, the computer program product is a locally-operating web server which receives, from a server operating on a remote device across a network connection, a list of shared printers currently available on a network. The locally-operating web server forms a modified list of printers available on the local computer, and sends a page to a locally-operating web browser containing the modified list. The browser responds with a page indicating a particular printer to connect to, and the local web server configures the local system to connect to and properly communicate with the particular printer.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Various embodiments are provided for implementing an integrated web-based user interface for configuring system parameters of remote machines.

Figure 1:
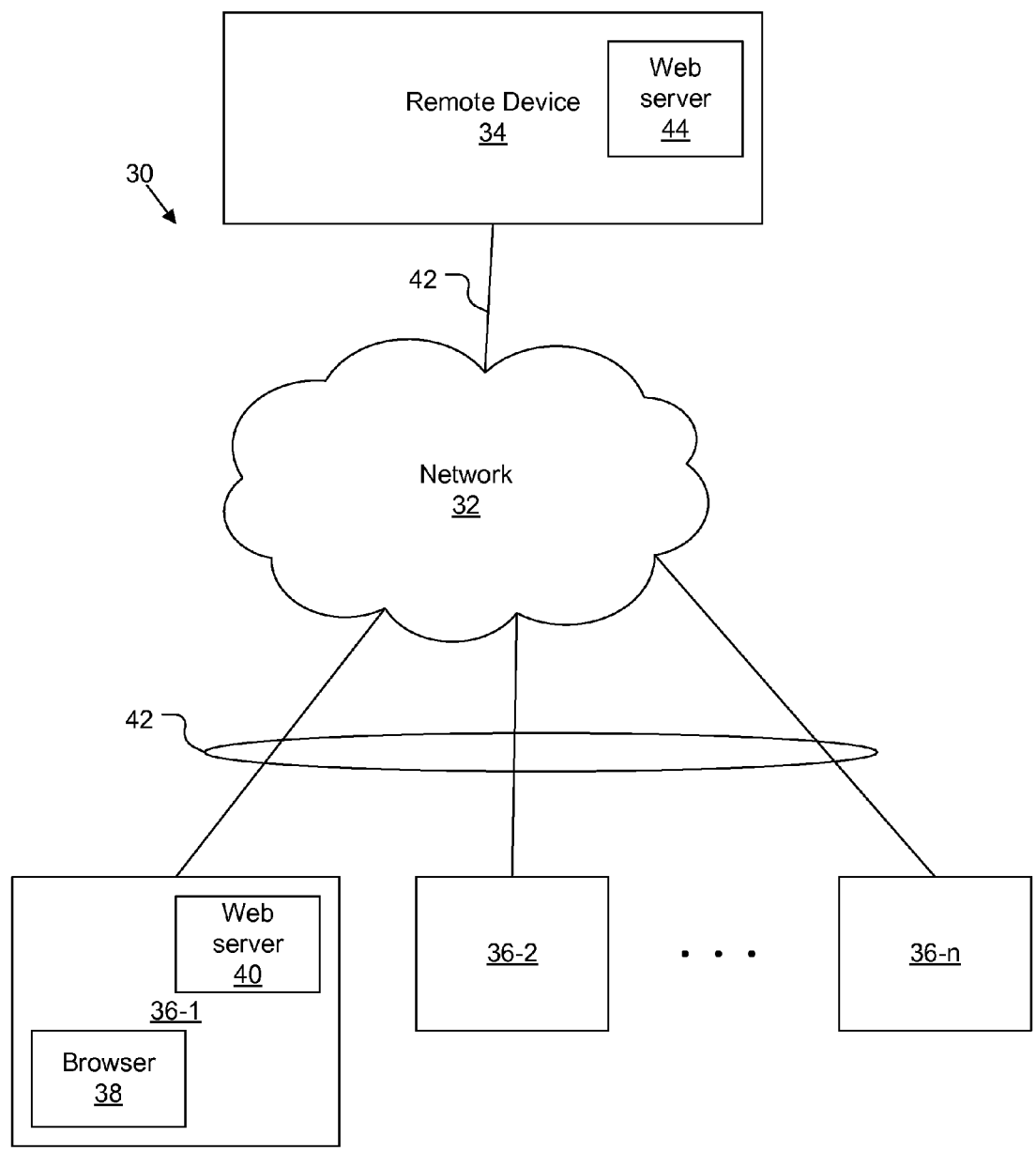
FIG. 1 illustrates a system for use in practicing various embodiments.

FIG. 1 depicts a system 30 for use in practicing various embodiments. The system 30 includes a computer network 32, which is attached to a remote device 34 and one or more computers 36. Each computer 36, in order to practice various embodiments, includes a locally-operating web browser 38 and a locally-operating web server 40. Each computer 36 and remote device 34 connects to network 32 over a network connection 42. Remote device 34 also runs a web server 44.

The remote device 34 may be any device which operates over a network 32 and thus may itself be a computer. For example, remote device 34 may be a network server that allows various computers 36 on the network 32 to communicate with each other and share devices. Remote device 34 may also be a storage system which provides network storage to computers 36 on the network 32. Remote device 34 may be a general purpose computer, a computer with enhanced or augmented storage and/or networking capabilities, or it may be a special-purpose device.

As will be explained in further detail below, the web server 44 running on the remote device 34 enables a user to remotely access data (e.g., configuration information) regarding the remote device 34 as well as remotely make configuration changes on the remote device 34 (e.g., operating system configuration changes via the web server 44) through any web browser 38. Similarly, the locally-operating web server 40 running on each computer 36 enables the user to locally access data (e.g., configuration information) on that computer 36 as well as make configuration changes on that computer 36 (e.g., operating system configuration changes via the web server 44) via the web browser 38 running on that computer 36. As a result, the user is able to effectuate robust and reliable management and maintenance of the devices 34, 36 of the system 20 from a single web browser session and without the need for, and drawbacks of, custom heavy-weight style applications that use remote procedure calls as in conventional approaches.

Figure 2:
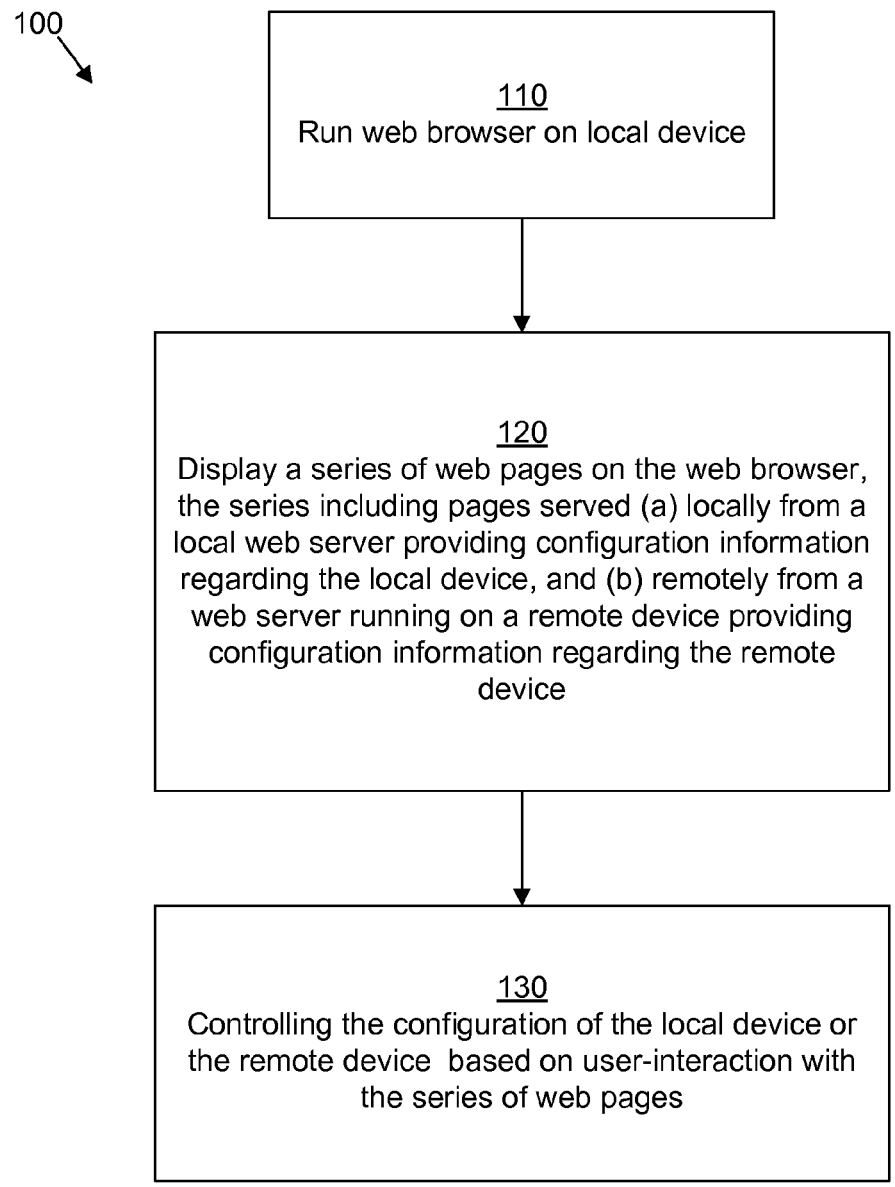
FIG. 2 illustrates a method embodying one aspect of the invention.

FIG. 2 depicts a method 100 of one embodiment. In step 100, a web browser 38 runs locally on a computer 36, for example computer 36-1. On the same computer 36-1, a local web server 40 also runs. A remote web server 44 runs on remote device 34. Web browser 38 communicates with both the local web server 40 and the remote web server 44 in an integrated fashion. The local web server 40 may provide local configuration information about computer 36-1 to web browser 38, while remote web server 44 may provide configuration information about the remote device 34 or the network 32 to web browser 38. A user accessing the web browser 38 is then able to use the browser 38 to communicate with the local web server 40 and the remote web server 44 in order to control the configuration of computer 36-1 and remote device 34, respectively.

Communication between the web browser 38 and both the local web server 40 and remote web server 44 is seamless. That is, both the local web server 40 and remote web server 44 provide the same user interface and look and feel to a user. Thus, the user is generally not able to tell which web server he is communicating with out looking at the address of the web page. A user is able to perform various configuration options using embodiments presented. More detail is provided in connection with FIGS. 3 and 4.

Figure 3:
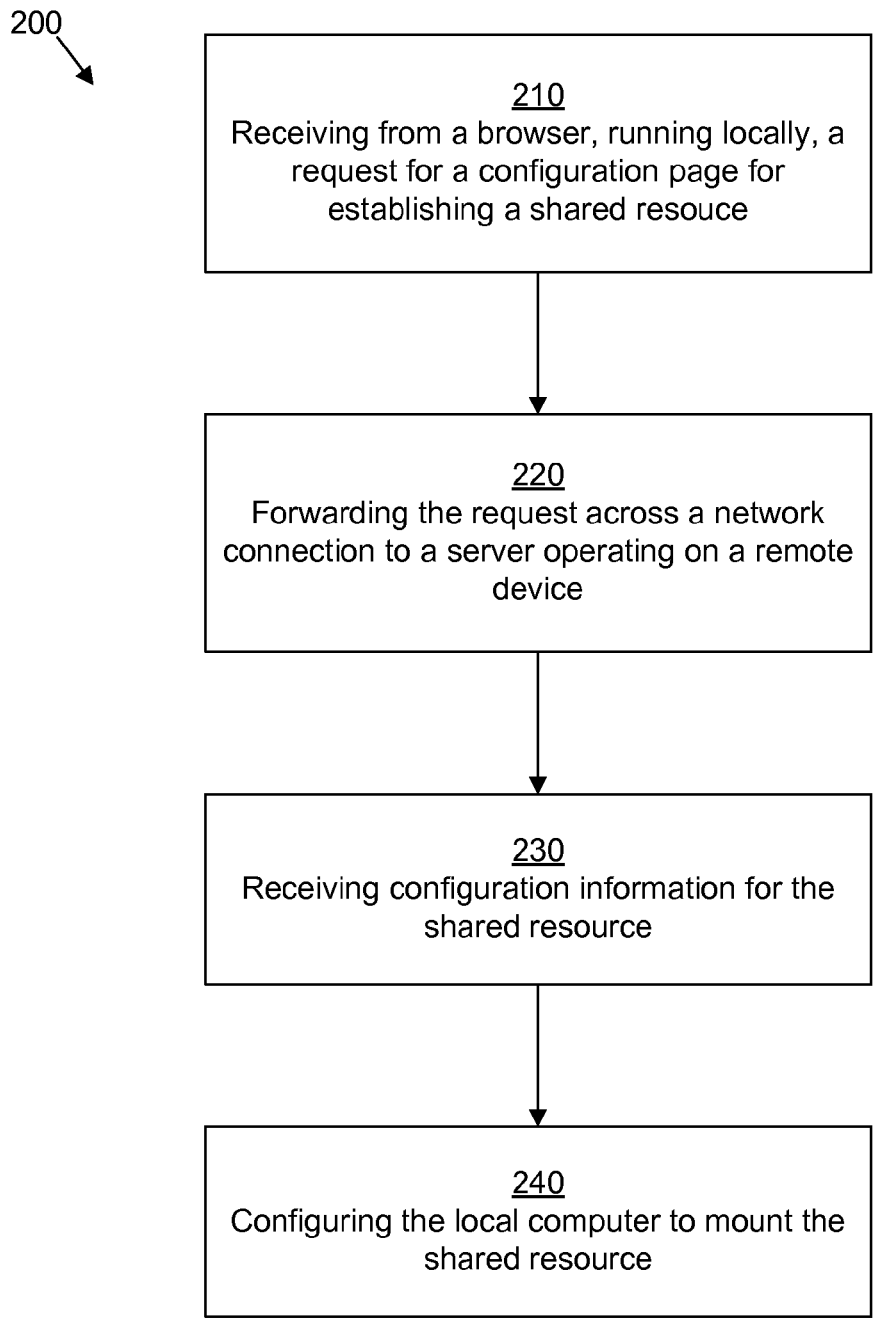
FIG. 3 illustrates steps performed by a computer program product embodying one aspect of the invention.

FIG. 3 depicts steps 200 performed by the local web server 38 operating on computer 36-1 in one embodiment of the invention. In FIG. 3, a user is attempting to share a resource over the network 32. For example, the user may be attempting to share with other computers 36 on the network 32 a user-owned folder stored within data storage provided on the remote device. Alternatively, the user may be attempting to share a folder local to computer 36-1 with other computers 36 on the network 32.

In step 210, the local web server 40 receives a request from the browser 38 for a configuration page for establishing a shared resource. Typically, a user will use the browser to surf to a home page provided by the local web server 40. The user might then click on a link for "Add Shared Folder." In some embodiments, this link points directly to the remote web server 44, and in other embodiments, the link points to the local web server 40. In the latter case, the local web server 40 receives this request for a configuration page (in this case for adding a shared folder). In another case, the link might be different and the corresponding request might be to share a local device across the network 32.

In either case, in step 220, the local web server 40 forwards the request across the network to the remote web server 44. At that point, the remote web server 44 establishes a connection with the browser 38, the remote web server 44 providing the browser with one or more pages that seek information from the user to allow the resource to be properly shared. Thus, the remote web browser may send one page to the browser 38, and the user may use the browser 38 to send one response containing configuration details (for example by posting such information with HTTP posting or with JavaScript posting) back to the remote web server 44. Or, the browser 38 and the remote web server may exchange several communications back-and-forth, the remote web server 44 sending successive pages requesting additional information in response to particular configuration details posted back to the remote web server 44 by the browser 38 at user command.

Once the remote web server 44 has collected enough configuration information to allow the remote device 34 to be properly configured to share the resource in accordance with the user's wishes, the remote web server 44 may send out a page including a confirmation of the sharing and any configuration details that are needed for the computer 36-1 to be able to access the shared resource. In some embodiments, the remote web server 44 sends such page directly to the local web server 40, while in other embodiments, the remote web server 44 sends such page to the browser with a redirect command, instructing the browser to forward the page to the local web server 40. In either case, in step 230, the local web server 40 receives the page containing the configuration details (or, in some embodiments, XML data encoding the configuration details).

In step 240, the local web server 40 uses the received configuration details in order to configure the resource to be shared with computer 36-1. Thus, if the configuration details specify a network address at which a shared folder may be accessed, then the local web server 40 may modify the registry, or another similar structure, of the operating system of computer 36-1 in order to mount the shared folder. In order to assign a drive letter or a name to the mounted shared folder, the local web server 40 may send pages to the browser 38 in order to request such drive letter or name from the user. The user will typically not be able to notice any distinction between the user interface or look and feel of the pages served by the local web server 40 or the remote web server 44. Once the user responds back to the local web server 40 by sending the requested information back by posting through the browser 38, the local web server 40 may mount the shared drive according to user preference. The local web server 40 may then present a confirmation page back to the user (by sending it to the browser 38 in response to the posting of information) including the final configuration details.

Figure 4:
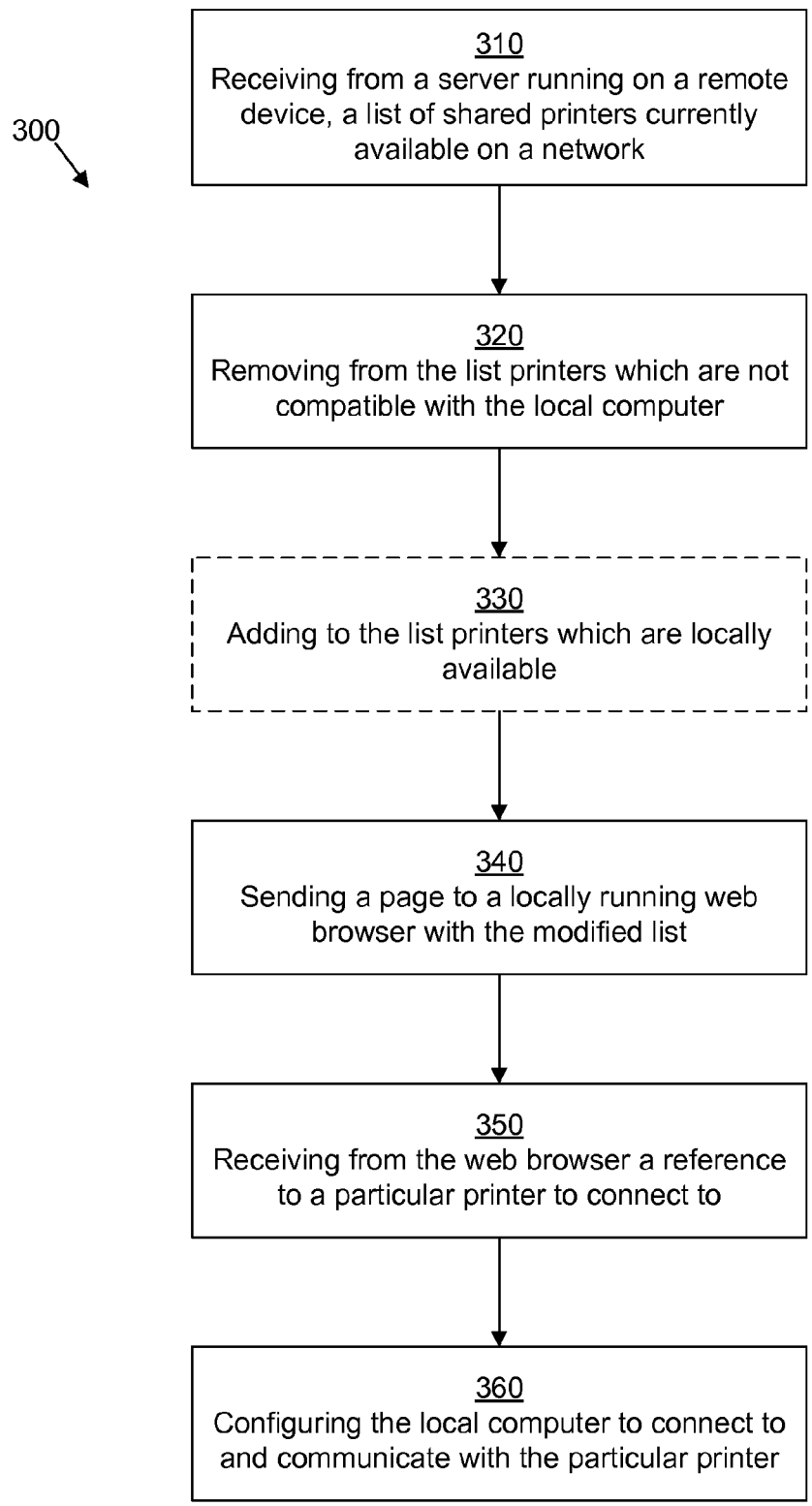
FIG. 4 illustrates steps performed by a computer program product embodying one aspect of the invention.

FIG. 4 depicts steps 300 performed by the local web server 38 operating on computer 36-1 in one embodiment of the invention. In FIG. 4, a user is attempting to connect to a printer (or other device). The user may be attempting to connect either to a shared network printer (attached directly to the remote device 34 or to another computer 36 on the network 32) or to a locally-attached printer. Typically, the user will use the browser to surf to a home page provided by the local web server 40. The user might then click on a link for "Settings." In some embodiments, this link points directly to the remote web server 44, and in other embodiments, the link points to the local web server 40. In the latter case, the local web server 40 receives this request for a "Settings" page and sends a web page to browser 38 asking the user to select a particular "Settings"-related task, while also sending a request to the web server 44 for settings details.

In step 310, the local web server 40 receives from the remote web server a list of printers (or other devices) attached to the network. In some embodiments, the list of printers is sent together with other "Settings"-related information, while in other embodiments, only the list of printers is sent. In some embodiments the list of printers includes all printers configured to be shared on the network 32, while in other embodiments, the list only includes printers that are currently available. In other embodiments, all printers configured to be shared on the network 32 are included on the list, but printers which are currently available are flagged as such.

In step 320, local web server 40 removes from the list all printers which are not compatible with computer 36-1. For example, if printer ABC is shared on the network, but printer ABC is only compatible with Microsoft Windows-based computers and computer 36-1 is a Unix-based computer, then printer ABC would be removed from the list. In some embodiments, local web server 40 also removes printers which are not flagged as available from the list. This forms a modified list.

In optional step 330, the modified list may be modified further, by the local web server further adding printers which are directly attached to the computer 36-1 to the modified list.

In step 340, the modified list is sent to the browser 38 in a web page. The web page lists all of the available printers on the modified list and allows the user to select a particular printer to connect to. The browser 38 posts this information back to the local web server 40.

In step 350, the local web server 40 receives this information selecting a particular printer from the browser 38. In step 360, the local web server 40 configures the computer 36-1 to establish a connection with the selected printer. If a driver for the selected printer is not installed and an installed driver is required for proper operation, then the local web server either installs the appropriate driver, or communicates with the user, through browser 38, to walk the user through installation of the appropriate driver.

In some embodiments, the steps performed by the local web browser depicted in FIGS. 3 and 4 may be included within a single computer program product that is capable of causing the computer 36-1 to perform the appropriate operation in response to detecting which operation a user wishes to perform.

In some embodiments, when the local web server 40 is launched, the web browser 38 is also (nearly) simultaneously launched. In some embodiments, in order to ensure that the local web server 40 is not running in multiple instances on the same computer 36-1, upon loading, the local web server 40 checks if another instance is already running, and if so, the new instance is (nearly) immediately terminated.

In some embodiments, before a user is able to communicate with remote device 34, the user must present login credentials (such as a username and password) for authentication and access purposes. In other embodiments, login credentials are only required in order to perform certain operations. For example, login credentials may be required in order to share a resource, but login credentials might not be required in order to connect to a shared printer or to list available devices. Thus, in the local web server depicted in FIG. 3, step 220 may include the additional step of the local web server 40 sending locally-stored login credentials for the user or the computer 36-1 to the remote device 34 before forwarding the request to the remote server 44. In another embodiment, the local web server 40 may post the login credentials in a hidden field (for example, using JavaScript posting) of the request being forwarded to the remote server 44, so that the remote server 44 will only respond with the requested information if the login credentials are correct.

In some embodiments, to ensure that the local web server 40 and the remote web server 44 are running compatible (or at least minimally compatible) versions, an integer version number is passed between the servers. In one embodiment, the remote web server 44 passes an expected version number to the local web server 40. If the version number coded into the local web server 40 matches the expected version number received from the remote web server 44, then the local web server 40 and the remote web server 44 are precisely paired. In another embodiment, the remote web server 44 passes a minimum expected version number to the local web server 40. If the received minimum version number is greater than the version number coded into the local web server 40, then the local web server 40 sends a page to the browser 38 telling the user to upgrade the local web server 40. In some embodiments, if the local web server 40 is too old to properly work with the remote web server 44, then the remote web server 44 may send alternative pages to the local web server 40 which are compatible with the older version.

Figure 5:
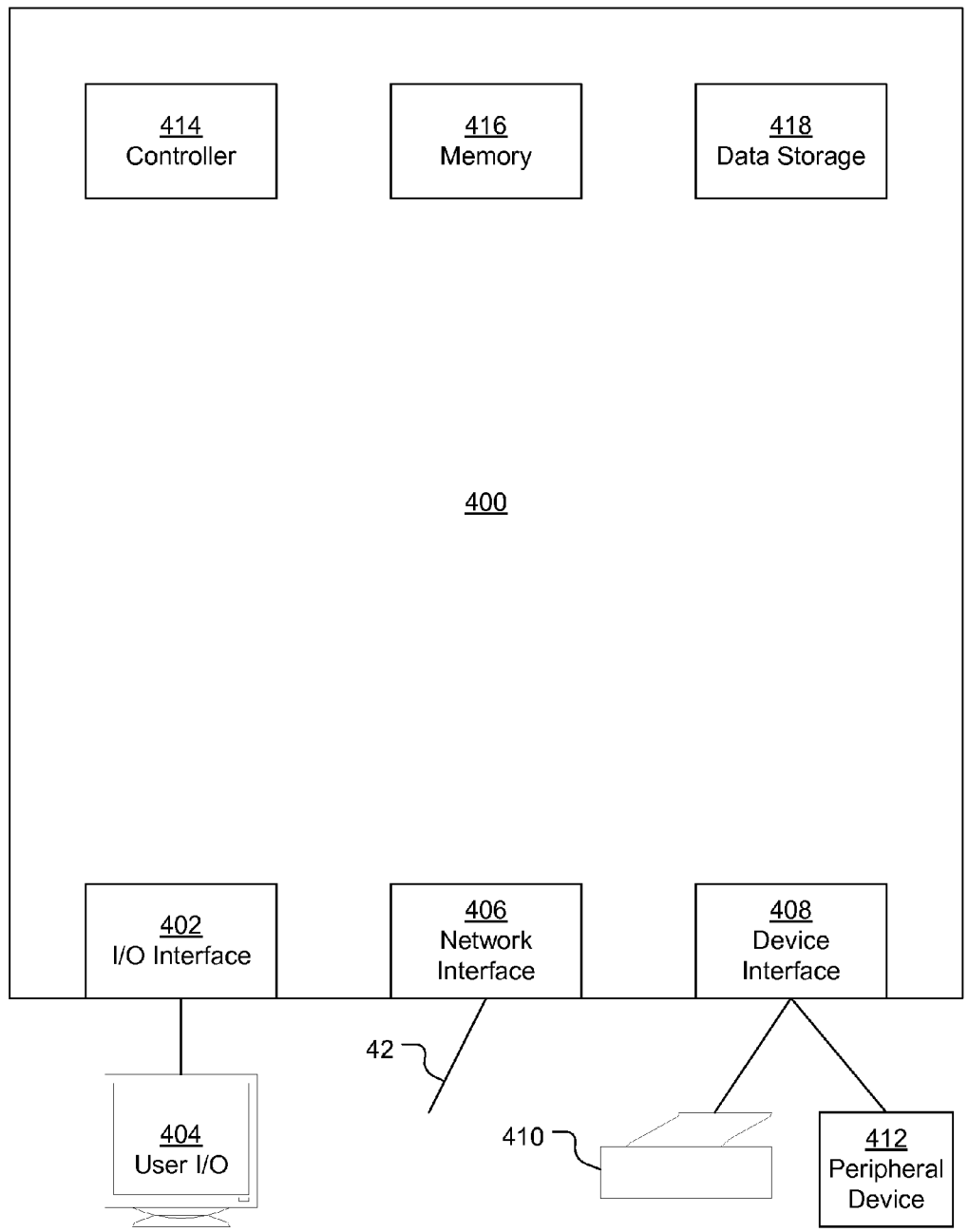
FIG. 5 illustrates an apparatus for use in practicing embodiments of the invention.

FIG. 5 depicts a computer 400 for use in practicing embodiments of the invention. Computer 400 may be a computer 36, or it may be remote device 34. Computer 400 includes an I/O interface 402 for connecting to one or more I/O device 404, such as a monitor (depicted), a keyboard (not depicted), or a mouse (not depicted). A monitor 404 may display a web page as rendered by browser 38. Computer 400 also includes a network interface 406 for connecting to network connection 42, and a device interface 408 for connecting to one or more printer 410 or one or more other peripheral device 412. Computer 400 also contains a controller 414, which runs programs which are stored in memory 416. Computer 400 may also include non-volatile data storage 418, for example, so that remote device 34 may function as a network storage system.

While various embodiments of the invention have been particularly shown and described, it will be understood by those skilled in the art that various changes in form and details may be made therein without departing from the spirit and scope of the invention as defined by the appended claims.

What is claimed is:

1. A method for operating a system which includes a local device running a local web server and a remote device running a remote web server, the method comprising:
   running a web browser on the local device;
   rendering a series of web pages on the web browser, the series of web pages including (i) a set of local web pages served from the local web server, the set of local web pages providing configuration information regarding the local device, and (ii) a set of remote web pages served from the remote web server, the set of remote web pages providing configuration information regarding the remote device; and controlling the configuration of the local device or the remote device based on user interaction with the series of web pages;

wherein the configuration information provided by the set of remote web pages includes a list of remote printing devices available through the remote device for printing;

wherein rendering the series of web pages includes listing, at the web browser, local printing devices available on the local device and remote printing devices from the list of remoter printing devices available through the remote device in a single integrated list of printing devices available to the local device;

wherein controlling the configuration of the local device includes:
  at the web browser, selecting a particular printer from the integrated list of printing devices; and
  at the local web server, receiving selection information from the web browser selecting the particular printer and configuring the local device to establish a connection with the particular printer;

wherein configuring the local device to establish a connection with the particular printer includes, if a driver for the particular printer is not installed on the local device, then effecting an installation of the driver on the local device.

2. A method as in claim 1 wherein rendering the series of web pages includes:
  displaying local web pages from the local web server and remote web pages from the remote web server in an interleaved manner.

3. A method as in claim 2 wherein displaying the local web pages and the remote web pages includes:
  providing an appearance of a user web session at a single web site.

4. A method as in claim 1 wherein listing local printing devices available on the local device and remote printing devices available through the remote device in a single integrated list of printing devices available to the local device includes:
  omitting from the integrated list printers which are not compatible with the local device.

5. A method as in claim 1 wherein running the web browser on the local device includes:
  launching the local web server on the local device;
  if another instance of the local web server is already running on the local device, terminating one of the instances of the local web server; and
  in response to launching the local web server, launching the web browser on the local device and causing the web browser to load a default page served by the local web server.

6. A method as in claim 1 wherein controlling the configuration of the local device or the remote device based on user interaction with the series of web pages includes modifying both a local configuration of the local device and a remote configuration of the remote device based on user interaction with the series of web pages.

7. A method as in claim 6 wherein modifying the local configuration of the local device includes operating the local web server to effect a system-level configuration change on the local device.

8. A method for operating a system which includes a local device running a local web server and a remote device running a remote web server, the method comprising:
  running a web browser on the local device;
  rendering a series of web pages on the web browser, the series of web pages including (i) a set of local web pages served from the local web server, the set of local web pages providing configuration information regarding the local device, and (ii) a set of remote web pages served from the remote web server, the set of remote web pages providing configuration information regarding the remote device; and
  controlling the configuration of the local device or the remote device based on user interaction with the series of web pages;
  wherein controlling the configuration of the local device or the remote device based on user interaction with the series of web pages includes modifying both a local configuration of the local device and a remote configuration of the remote device based on user interaction with the series of web pages;
  wherein the configuration information provided by the set of remote web pages includes a list of remote printing devices configured to be shared across a network;
  wherein the configuration information provided by the set of local web pages served from the local web server includes a list of local printing devices directly attached to the local device; and
  wherein the method further includes displaying to a user of the local device, via the web browser, a single integrated list of printing devices available to be configured to operate with the local device, the single integrated list including printing devices on the list of remote printing devices configured to be shared across the network and printing devices on the list of local printing devices directly attached to the local device.

* * * * *